(12) United States Patent
Gronenborn et al.

(10) Patent No.: US 11,899,108 B2
(45) Date of Patent: Feb. 13, 2024

(54) TIME-OF-FLIGHT IMAGING SYSTEM FOR AUTONOMOUS MOVABLE OBJECTS

(71) Applicant: TRUMPF Photonic Components GmbH, Ulm (DE)

(72) Inventors: Stephan Gronenborn, Ulm (DE); Jan Jasper Van den Berg, Eindhoven (NL); Matthew John Lawrenson, Eindhoven (NL); Nicholas Walker, Eindhoven (NL)

(73) Assignee: TRUMPF PHOTONIC COMPONENTS GMBH, Ulm (DE)

( * ) Notice: Subject to any disclaimer, the term of this patent is extended or adjusted under 35 U.S.C. 154(b) by 574 days.

(21) Appl. No.: 16/931,518

(22) Filed: Jul. 17, 2020

(65) Prior Publication Data

US 2020/0356092 A1   Nov. 12, 2020

Related U.S. Application Data

(63) Continuation of application No. PCT/EP2019/050373, filed on Jan. 9, 2019.

(30) Foreign Application Priority Data

Jan. 19, 2018   (EP) .................................. 18 152 471

(51) Int. Cl.
*G01S 17/10* (2020.01)
*G01S 17/931* (2020.01)
(Continued)

(52) U.S. Cl.
CPC .......... *G01S 17/10* (2013.01); *G01C 21/3833* (2020.08); *G01S 17/89* (2013.01);
(Continued)

(58) Field of Classification Search
CPC ........ G01S 17/10; G01S 17/89; G01S 17/894; G01S 17/931; G01S 17/933; G01S 17/87;
(Continued)

(56) References Cited

U.S. PATENT DOCUMENTS 10,788,316 B1 *   9/2020   Kalscheur ............. G01S 7/4972
2008/0208472 A1   8/2008   Morcom
(Continued)

FOREIGN PATENT DOCUMENTS

CN          1981209 A     6/2007
CN        104808216 A     7/2015
(Continued)

*Primary Examiner* — Jess Whittington
*Assistant Examiner* — Brian E Yang
(74) *Attorney, Agent, or Firm* — LEYDIG, VOIT & MAYER, LTD.

(57) ABSTRACT

A guiding system guides an autonomous movable object. The guiding system has a time-of-flight imaging system, which has a first light source to illuminate a first field of detection; and a light sensor. The light sensor detects first and second reflected light. The first reflected light has light emitted by the first light source reflected at the first field of detection. The second reflected light originates from a second field of detection illuminated by a second light source, which is independent from the first light source and is coupled to a different movable object. The imaging system differentiates between the first and second reflected light, determines a depth map of the first field of detection based on the detected first reflected light, and generates feedback. The imaging system has a motion controller that receives the feedback, and modifies a motion of the autonomous movable object based on the feedback.

15 Claims, 8 Drawing Sheets

(51) Int. Cl.
*G01S 17/894* (2020.01)
*G01C 21/00* (2006.01)
*G01S 17/933* (2020.01)
*G05D 1/00* (2006.01)
*G05D 1/02* (2020.01)
*G05D 1/10* (2006.01)
*G01S 17/89* (2020.01)

(52) U.S. Cl.
CPC .......... *G01S 17/894* (2020.01); *G01S 17/931* (2020.01); *G01S 17/933* (2013.01); *G05D 1/0088* (2013.01); *G05D 1/0231* (2013.01); *G05D 1/0276* (2013.01); *G05D 1/101* (2013.01)

(58) Field of Classification Search
CPC ............. G01C 21/3833; G05D 1/0088; G05D 1/0231; G05D 1/0276; G05D 1/101
See application file for complete search history.

(56) References Cited

U.S. PATENT DOCUMENTS

| | | | |
|---|---|---|---|
| 2015/0037039 A1* | 2/2015 | Chang | H04Q 9/00 |
| | | | 398/106 |
| 2015/0373322 A1 | 12/2015 | Atanassov et al. | |
| 2016/0231746 A1 | 8/2016 | Baldwin et al. | |
| 2017/0020627 A1* | 1/2017 | Tesar | A61B 90/361 |
| 2017/0025017 A1* | 1/2017 | Thomas | G06F 18/254 |
| 2017/0074976 A1* | 3/2017 | Takahashi | G01C 3/085 |
| 2017/0146659 A1 | 5/2017 | Kovermann et al. | |
| 2017/0242109 A1 | 8/2017 | Cook et al. | |
| 2019/0049583 A1* | 2/2019 | Xu | G01S 17/34 |

FOREIGN PATENT DOCUMENTS

| | | |
|---|---|---|
| CN | 106662649 A | 5/2017 |
| DE | 102006007173 A1 | 8/2007 |
| DE | 102009028300 A1 | 2/2011 |
| JP | 2008241258 A | 10/2008 |
| JP | 2017125829 A | 7/2017 |

* cited by examiner

TIME-OF-FLIGHT IMAGING SYSTEM FOR AUTONOMOUS MOVABLE OBJECTS

CROSS-REFERENCE TO PRIOR APPLICATIONS

This application is a continuation of International Patent Application No. PCT/EP2019/050373, filed on Jan. 9, 2019, which claims priority to European Patent Application No. EP 18 152 471.1, filed on Jan. 19, 2018. The entire disclosure of both applications is hereby incorporated by reference herein.

FIELD

The invention relates to a time-of-flight imaging system for guiding autonomous movable objects, a guiding system comprising the imaging system, systems comprising at least two autonomous movable objects equipped with the imaging system or the guiding system, a method of guiding autonomous movable objects and a corresponding computer program product.

BACKGROUND

US 2016/0231746 A1 discloses an autonomous guidance system that operates a vehicle in an autonomous mode. The system includes a camera module, a radar module, and a controller. The camera module outputs an image signal indicative of an image of an object in an area about a vehicle. The radar module outputs a reflection signal indicative of a reflected signal reflected by the object. The controller determines an object-location of the object on a map of the area based on a vehicle-location of the vehicle on the map, the image signal, and the reflection signal. The controller classifies the object as small when a magnitude of the reflection signal associated with the object is less than a signal-threshold.

US 2017/242109 A1 discloses an adaptive ladar receiver and associated method whereby the active pixels in a photodetector array used for reception of ladar pulse returns can be adaptively controlled based at least in part on where the ladar pulses were targeted.

DE 10 2009 028 300 A1 relates to a sensor device for a driver assistance system of a vehicle with at least two sensors. The two sensors are arranged at and aligned with the rear region of the same vehicle and such that the detection regions of the two sensors overlap at least partially.

DE 10 2006 007 173 A1 discloses a vehicle surroundings recognition system. The vehicle comprises a front radar sensor and a blind spot radar sensor that operate synchronously in overlapping areas. Both sensors are arranged at the same vehicle.

SUMMARY

In an embodiment, the present invention provides a guiding system that is for guiding an autonomous movable object. The guiding system has a time-of-flight imaging system, which has a first light source to illuminate a first field of detection; and at least one light sensor. The light sensor is configured to detect reflected light. The detected reflected light has first reflected light and second reflected light. The first reflected light has light emitted by the first light source reflected at the first field of detection. The second reflected light originates from a second field of detection illuminated by a second light source. The second light source is independent from the first light source. The second light source is a light source coupled to a different movable object. The time-of-flight imaging system is configured to differentiate between the first reflected light and the second reflected light. The time-of-flight imaging system is configured to determine a depth map of the first field of detection based on the detected first reflected light. The time-of-flight imaging system is configured to generate a feedback signal for triggering a feedback action based on the detected second reflected light. The imaging system also has a motion controller that receives the feedback signal, and modifies a motion of the autonomous movable object based on the feedback signal.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
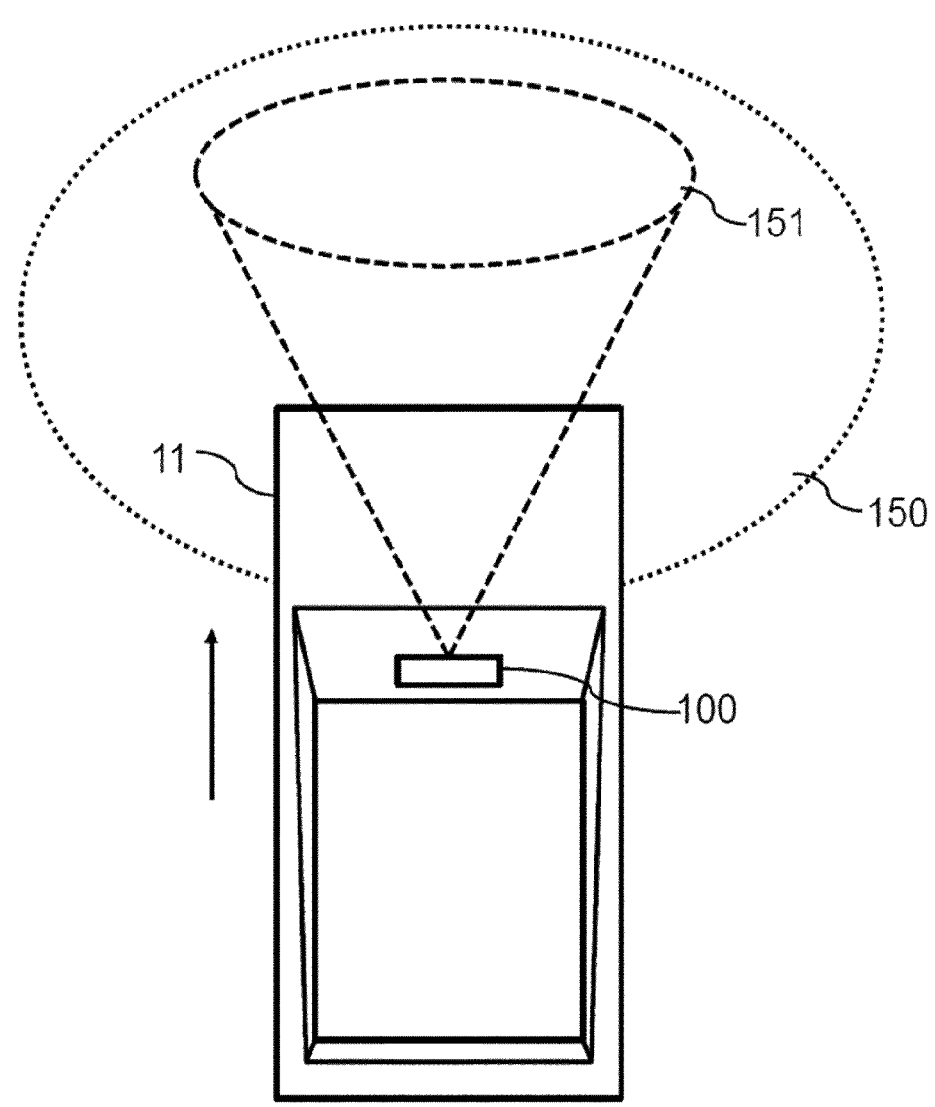
FIG. 1 shows a principal sketch of a first autonomous vehicle comprising a first imaging system.

The present invention provides an improved time-of-flight imaging system and a method for guiding autonomous movable objects. Autonomous movable objects may be autonomous road vehicles autonomous unmanned aerial vehicles and the like.

According to a first aspect, a time-of-flight imaging system for guiding autonomous movable objects is provided. The imaging system comprises a first light source. The first light source is arranged to illuminate a first field of detection. The imaging system comprises at least one light sensor. The at least one light sensor is arranged to detect reflected light. The detected reflected light comprises first reflected light and second reflected light. The first reflected light comprises light emitted by the first light source reflected at the first field of detection. The second reflected light originates from a second field of detection illuminated by a second light source. The second light source is independent from the first light source. The second light source is especially a light source coupled to a different movable object especially a different autonomous movable object. The imaging system is arranged to differentiate between the first reflected light and the second reflected light. The imaging system is arranged to determine a depth map of the first field of detection based on the detected first reflected light. The imaging system is arranged to generate a feedback signal for triggering a feedback action based on (in response to and/or indicative of) the detected second reflected light. The depth map is calculated based on the time-of-flight measurements performed. The time-of-flight measurements are performed by recording a time of emission of the light emitted by the first light source to the first field of detection, and the time of detection of light by means of the at least one light sensor, wherein the detected light is emitted by the first light source and reflected by an object in the first field of detection.

The light sensor may be arranged to provide a nonlinear response upon detection of the received light. The nonlinear response may enable detection of very low optical intensities resulting from the received light. The light sensor may, for example, comprise one or more (e.g. an array of) single photon avalanche diodes (SPAD) which are well-suited to detect time-of-flight signals.

The first light source may comprise a single light emitter in a scanning arrangement. The first light source may, alternatively or in addition, comprise a multitude of light emitters (array arrangement), which are arranged to emit light to the first field of detection. The first light source may comprise one or more optical devices (e.g. lenses and the like) to illuminate the first field of detection.

The imaging system may improve performance of detection by taking into account that determination of the depth map may be affected by, for example, other light-emitting autonomous movable objects especially autonomous vehicles within detection range. Existing solutions for the removal of, for example, noise may be complex and do not actively respond to the imaging behavior of other vehicles. These systems also fail to take advantage of the information that can be obtained from the light reflections created by other vehicles, which can be used for various purposes including imaging, scanning, mapping, route planning and navigation as further described below.

The field-of-view of the light sensor may, for example, be more extended as the first field of detection. The light sensor may in this case detect light reflected from the first field of detection and neighboring areas, which are not illuminated by the first light source. This may enable detection of a second reflected light prior to an overlap. The corresponding feedback signal may in this case be generated prior to an interaction and a potential disturbance caused by light emitted by the second light source.

The light sensor of the imaging system may comprise at least a first light sensing device and a second light sensing device, wherein the first light sensing device is arranged to detect the first reflected light and wherein the second light sensing device is arranged to detect the second reflected light. The first light sensing device is arranged to detect self-induced illumination. The second light sensing device is arranged to detect externally-induced illumination. The first and the second light sensing device may have different fields of detection, different spectral sensitivity, or some other detection parameter. The imaging system may optionally comprise two, three, four, or more light sensing devices.

The second reflected light may comprise light emitted by a time-of-flight detection system. The imaging system is arranged to identify light originating from the time-of-flight detection system based on the detected second reflected light. The feedback signal is adapted in accordance with the detected light emitted by the time-of-flight detection system. Light emitted by the time-of-flight detection system may, for example be identified based on the short pulse length and other characteristic imaging parameters. The feedback signal may comprise information about the detection pattern and optionally information to adapt the detection pattern of the time-of-flight detection system. The time-of-flight detection system may optionally be an imaging system as described above and below.

The imaging system may be arranged such that the second reflected light is received from an overlap of the first field of detection and the second field of detection. Light received from an overlap of the first field of detection and the second field of detection indicates that a second autonomous movable object (e.g. autonomous car) may scan or observe at least a part of the first field of detection. Knowledge about this overlap enables a multitude of feedback signals and corresponding reactions.

The imaging system may, for example, be arranged to modify the first field of detection based on the feedback signal. The imaging system may especially be arranged to modify the first field of detection such that the overlap between the first field of detection and the second field of detection is reduced if the second light is emitted by a time-of-flight detection system. Decreasing the overlap may reduce disturbance caused by the time-of-flight detection system.

The imaging system may, alternatively or in addition, be arranged to modify an emission wavelength of the first light source. The emission wavelength may be changed in order to reduce cross talk with the second light source. The first light source may comprise a tunable light emitter or groups of light emitters, which are characterized by different emission wavelengths. The light sensor may be tunable (e.g. tunable filter) in accordance with the emission wavelength of the first light source. The light sensor may alternatively comprise light sensing devices, which are sensitive in different wavelength ranges. The light sensing device or devices comprised by the light sensor may be selected depending on the emission wavelength of the first light source.

The imaging system may be arranged to modulate the light source to integrate an optical information signal in the first field of detection in reaction to the detected second reflected light. The optical information may, for example, comprise an information about time of emission, position at time of emission, velocity, intended driving direction etc. The information may, in a simple embodiment, be a sign like an arrow. The information may, alternatively or in addition, comprise coded information (pulse pattern), which can be detected by means of a second imaging system comprised by a second (optionally autonomous) movable object.

The imaging system may comprise or be coupled with a communication module. The communication module is arranged to establish a communication channel in reaction to the detected second reflected light to exchange information data related to the detected second reflected light. The communication channel is independent from the first light source. The communication channel may be based on any suitable communication technology (radio frequency based communication, optical communication and the like). Exchange of information related to the detected second reflected light may enable interaction of the imaging system with, for example, a time-of-flight detection or imaging system of a second, third or fourth (autonomous) movable objects as, for example, autonomous road vehicle.

The imaging system may, for example, be arranged to modify the first field of detection based on information data received via the communication channel. The imaging system may (optionally in corporation with a system of an autonomous movable object comprising the imaging system) be arranged to adapt the first field of detection in accordance with a corresponding adaption of a field of detection of, for example, a vehicle being in communication with the imaging system. Two vehicles may, for example, adapt the corresponding field of detections in order to suppress cross talk. The imaging system may be further arranged to exchange data describing a surrounding of the, for example, vehicle (e.g. time-of-flight measurement data, part of the depth map etc.). The imaging system may therefore share information and optionally also receive information via the other communication channel to improve knowledge about the surrounding of the autonomous movable object. The imaging system may further be arranged to exchange driving data comprising information about the intended moving or driving direction, intended acceleration, intended break events and the like. Detection of the second reflected light enables verification of the information source. The source of the second reflected light has to be nearby to the autonomous movable object comprising the imaging system. Furthermore, information may be integrated in the second reflected light in order to verify a communication partner, which is contacted via the communication channel. An authentication code may be exchanged via the received second reflected light to authenticate the autonomous mobile object comprising the imaging system. The data or information exchanged by means of the communication channel may be further used (especially in combination with the second reflected light) to verify driving or more generally information related to movements received from other information sources.

The first light source comprises at least one laser. The at least one laser may preferably be a semiconductor-based laser like, for example, an edge emitting laser or a VCSEL or VCSEL array. Especially VCSEL arrays may be well suited to enable a cost-effective imaging system. The at least one laser may be arranged to illuminate the first field of detection with infrared laser light. The wavelength range of the infrared laser light may be, for example, between 750 nm and 1500 nm. The first reflected light and the second reflected light may be in the same wavelength range.

According to a further aspect, a guiding system for guiding the autonomous movable object is provided. The guiding system comprises the imaging system according to anyone of the embodiments described above. The guiding system further comprises a motion control module. The motion control module is arranged to receive the feedback signal (based on or indicative of the second detected light). The motion control module is arranged to modify a motion of the autonomous movable object based on the feedback signal. The motion control system may use the feedback signal to trigger a feedback action. The feedback action may, for example, be an adaption of a driving direction. The driving direction may be adapted in order to reduce cross talk with another time-of-flight detection system and/or to increase security. Adapting a driving direction may comprise adapting a velocity of the autonomous movable object. An autonomous movable object may refer to a fully autonomous movable object or a partially autonomous movable object, for example a vehicle providing driver assistance such as assisted steering and/or (emergency) braking. For example, the guiding system may adapt the driving detection to perform collision avoidance or collision mitigation based on detection of the second detected light. For example, the second detected light may originate from a second time-of-flight imaging system of a second vehicle.

According to a further aspect, a first system comprising a first autonomous movable object and a second autonomous movable object is provided. Each of the first and the second autonomous movable object comprises an imaging system according to any embodiment described above or a guiding system. The first autonomous movable object and the second autonomous movable object are arranged to exchange data in reaction to the feedback signal. The first autonomous movable object or the second autonomous movable object is/are arranged to modify a corresponding field of detection, or to modify a motion of the first autonomous movable object or the second autonomous movable object, or to take into account data of a depth map determined by the other autonomous movable object in reaction to the exchanged data. The data, which may be generated by the first of the second autonomous movable object, may be exchanged via the field of detection or by means of a separate communication channel as described above. The communication module may be part of the imaging system or the guiding system or a separate communication module in communication with the imaging system or guiding system. The data may optionally comprise information, which of the first or the second autonomous movable object may act as master and which as a slave.

According to a further aspect, a second system is provided. The second system comprises a multitude of autonomous movable objects. Each of the autonomous movable objects comprises a guiding system described above. Each of the autonomous movable objects is arranged to modify the motion of the respective autonomous movable object in reaction to the feedback signal generated upon detection of at least one field of detection of another autonomous movable object. There may be two, three, four, or more fields of detection of two, three, four or more other autonomous movable objects. The second system may be arranged to enable a swarm behavior of the multitude of autonomous movable objects. Swarm behavior may be advantageous with respect to autonomous road vehicles but especially with respect to unmanned aerial vehicles.

According to a further aspect, a method of guiding an autonomous movable object is provided. The method comprises the steps of:
illuminating a first field of detection,
detecting reflected light, wherein the detected reflected light comprises first reflected light and second reflected light, wherein the first reflected light comprises light illuminating the first field of detection, wherein the second reflected light originates from a second field of detection illuminated independently from illumination of the first field of detection,
differentiating between the first reflected light and the second reflected light,
determining a depth map of the first field of detection based on the detected first reflected light for guiding the autonomous movable object,
generating a feedback signal for triggering a feedback action based on the detected second reflected light for guiding the autonomous movable object, and
modifying a motion of the autonomous movable object based on the feedback signal.

According to a further aspect, a computer program product is provided. The computer program product comprises code means, which can be saved on at least one memory device of the imaging system in accordance with any embodiment discussed above or on at least one memory device of a device comprising the imaging system. The code means are arranged such that the method presented above can be executed by means of at least one processing device of the imaging system or by means of at least one processing device of the device comprising the imaging system.

The memory device or the processing device may be comprised by the imaging system (e.g. electrical driver, evaluator, etc.) or the device comprising the time-of-flight depth camera. A first memory device and/or first processing device of the device comprising the imaging system may interact with a second memory device and/or second processing device comprised by the imaging system.

The memory device or devices may be any physical device being arranged to store information, especially digital information. The memory device may be selected out of the group solid-state memory or optical memory.

The processing device or devices may be any physical device being arranged to perform data processing, especially processing of digital data. The processing device may be selected out of the group processor, microprocessor, or application-specific integrated circuit (ASIC).

It shall be understood that the imaging system according to any embodiment described above and the method of guiding an autonomous movable object have similar and/or identical embodiments, in particular, as described by means of the difference embodiments above and as defined in the dependent claims.

These and other aspects of the invention will be apparent from and elucidated with reference to the exemplary embodiments described hereinafter.

The invention will now be described, by way of example, based on embodiments with reference to the accompanying drawings.

In the Figures, like numbers refer to like objects throughout. Objects in the Figures are not necessarily drawn to scale.

FIG. 1 shows a principal sketch of a first autonomous vehicle 11 comprising an imaging system 100 according to a first embodiment. The imaging system 100 comprises a light source (e.g., an array of VCSELs), which is arranged to project a pattern of laser beams to a first field of detection 151. The imaging system 100 further comprises a light sensor, which comprises a first light sensing device (e.g., a SPAD array), which is arranged to detect laser light reflected from the first field of detection 151. The detection signal generated by the SPAD array is processed by the imaging system 100 to determine distances to objects in the first field of detection 151 based on time-of-flight measurements. The imaging system 100 determines a depth map of the first field of detection 151 based on the time-of-flight measurements.

The optical sensor further comprises a second light sensing device. The second light sensing device detects light, which is reflected from a field of observation 150. The field of observation 150 comprises, in this embodiment, the first field of detection 151. The second light sensing device comprises an array of photo diodes, which are arranged to generate electrical signals in reaction to light received from the field of observation 150. The imaging device 100 is further arranged to process the generated electrical signals to determine whether the light received from the field of observation 150 comprises light projected by means of a second vehicle to a second field of detection, which overlaps with the field of observation 150. The imaging system 100 generates a feedback signal in reaction to the detection of light emitted by a second vehicle. The feedback signal is used to trigger feedback actions. Several examples of feedback actions are discussed with respect to FIGS. 2-6.

Figure 2:
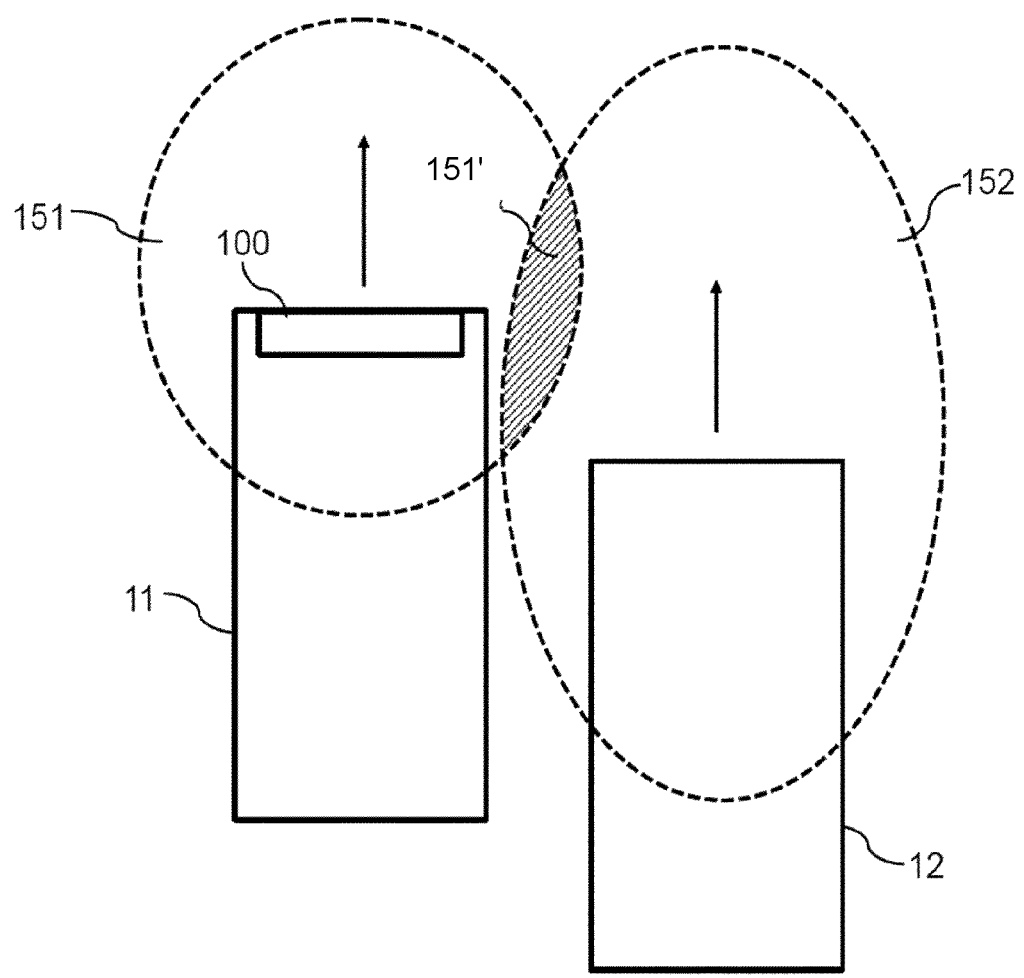
FIG. 2 shows a principal sketch of a first and a second autonomous vehicle comprising a second imaging system.

FIG. 2 shows a principal sketch of a first and a second autonomous vehicle according to a second embodiment. The first vehicle 11 comprises an imaging system 100 similar as discussed with respect to FIG. 1. A first field of detection 151 coincides in this embodiment with a field of observation. The imaging system 100 comprises a VCSEL array, which is arranged to emit laser beams to the first field of detection 151. The light sensor comprises in this embodiment one SPAD array, which is arranged to detect first reflected light and second reflective light. The imaging system 100 is arranged to read out the SPAD array in a first time period to detect the first reflected light comprising reflected laser light emitted by the VCSEL array. The measurement data is used to determine a depth map of (a part) of the surrounding the first vehicle 11. The imaging system 100 is further arranged to read out the SPAD array in a second time period to detect second reflected light. The second reflected light results from the light, which is emitted by a second vehicle 12 which may comprise a similar imaging system as discussed with respect to the first vehicle.

The second vehicle emits light to a second field of detection 152 which overlaps with the first field of detection 151 in overlap region or field 151'. The imaging system 100 of the first vehicle detects reflected light from the overlap region 151' in the second time period. The imaging system 100 is arranged to determine that the second reflected light, which is caused by light emitted by the second vehicle does not comprise any reflected light originating from the VCSEL array. The differentiation may, for example, be performed by choosing a duration between a time of emission of laser light emitted by the VCSEL array and the starting time of the second time period sufficiently long such that it is essentially impossible that the second reflected light comprises reflected laser light emitted by the VCSEL array. The imaging system 100 generates a feedback signal in reaction to the second reflected light originating from the light emitted by the second vehicle to the second field of detection 152. The feedback signal may be used to trigger a feedback action as, for example, described with respect to FIG. 4 or FIG. 5.

Figure 3:
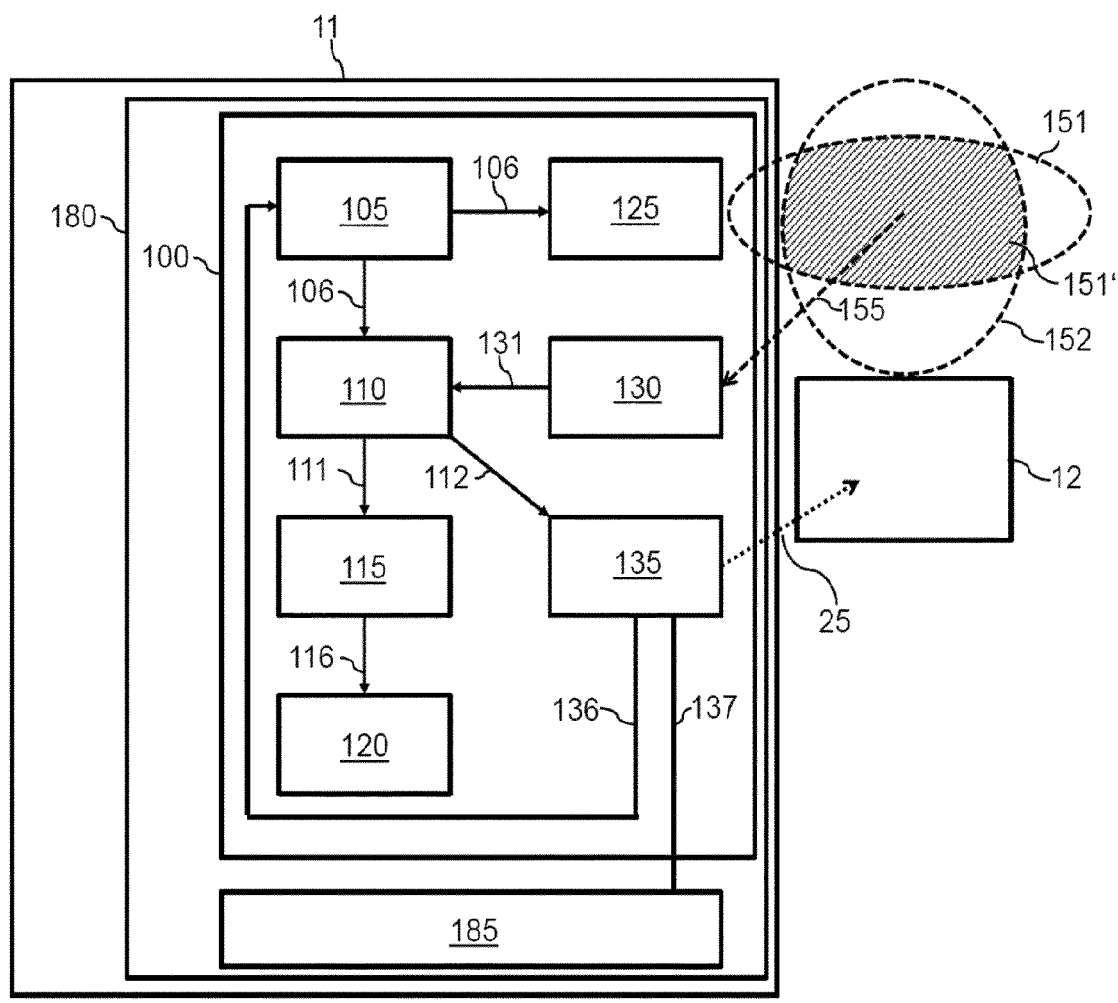
FIG. 3 shows a principal sketch of a first embodiment of a first system comprising a first and a second autonomous vehicle each comprising an imaging system according to a third embodiment.

FIG. 3 shows a principal sketch of a first system comprising first autonomous vehicle 11 comprising an imaging system 100 according to a third embodiment and a second autonomous vehicle 12 comprising an imaging system.

The first vehicle 11 comprises a guiding system 180. The guiding system 180 comprises the imaging system 100 and a motion control module 185, which is arranged to communicate with the imaging system 100. The imaging system 100 comprises an imaging parameters control module 105 that sets the imaging parameters 106, e.g. the pulse modulation frequency, the illumination direction, the scanning rotation speed, etc. The imaging system 100 further comprises a first light source 125, which is arranged to emit light to a first field of detection 151. The emissions of the first light source 125 are controlled to produce pulses, bursts, or flashes as required. The light emitted to the first field of detection 151 reflects from the various surfaces surrounding the first vehicle 11.

The imaging system 100 further comprises a light sensor 130, which is arranged to detect light emissions from the first light source that are reflected back to the first vehicle 11. The light sensor 130 may be arranged to calculate depth information using the principles of time-of-flight, whereby the flight time of the emitted and reflected light indicates the distance that light has travelled. Information or measurement data obtained by the light sensor 130 may be used to determine the distance separating the first vehicle 11 and another object, locate an object in the surrounding environment, or to build a point cloud of that environment for navigation. The light sensor 130 communicates light sensor data 131 to an illumination analysis module 110. The light sensor 130 is further arranged to detect light reflections created by an active light source of at least one additional imaging system.

A second vehicle 12 comprises one additional imaging system, which is arranged to emit light for time-of-flight measurements to a second field of detection 152. The second field of detection 152 overlaps with the first field of detection 151 in an overlap region 151' similar as discussed with respect to FIG. 2. Detection of second reflected light by means of light sensor 130 may be achieved through a dual-capability light sensor 130.

Alternatively, different types of light sensors may be used for separately detecting emissions from the first vehicle 11 and for detecting emissions from the second vehicle 12, e.g. using wide field-of-view or single pixel sensors. An illumination analysis algorithm comprised by an illumination analysis module 110 receives the light sensor data 131 from the light sensor 130 and the imaging parameters 106 from the imaging parameters control module 105, and uses this data to identify the components of the light sensor data 131 resulting from:
 a. Self-Induced Illumination—light which was emitted by the first vehicle 11 and detected by light sensor 130.
 b. Externally-induced Illumination—light which was emitted by a second vehicle 12 and detected by the light sensor 130 of the first vehicle 11.

A mapping module 115 is arranged to receive self-induced illumination data 111 from the illumination analysis module 110 and uses it to create and augment a map of the surrounding environment.

The mapping module 115 receives the self-induced illumination data 111 containing time-of-flight measurements generated by the first vehicle 11. The mapping module 115 uses the time-of-flight data to generate spatial information (spatial data 116') on the surrounding environment, indicating the locations of objects within detection range of the light sensor 130 illuminated by the first light source 125. A map database 120 is arranged to receive and store spatial data 116 received from the mapping module 115. The spatial data 116 is incorporated into or combined with any existing data on the surrounding area held in the map database 120.

The map database 120 may, in an alternative embodiment, be a cloud-based storage location that can receive spatial data 116 from all vehicles comprising detection systems, which can provide spatial data 116 (especially LIDAR enabled autonomous vehicles). The map database 120 may be populated as LIDAR-enabled autonomous vehicles travel through new locations. Gaps in the map database 120 may be filled collaboratively, by, for example, initiating a request to another vehicle, which already possesses the relevant spatial data 116 minimizing unnecessary scanning or distributing the scanning load between two or more autonomous vehicles travelling through the area and sharing the spatial data 116 for increased scanning efficiency.

The imaging system 100 further comprises a subsystem (feedback module 135') that receives the externally-induced illumination data 112 from the illumination analysis module 110. The externally-induced illumination data 112 is used to generate a feedback signal which may trigger a number of feedback actions. The externally-induced illumination data 112 may, for example, indicate the scanning behavior of the second vehicle 12 (or other vehicles), providing information such as:
 Information about the scanning parameters of the second vehicle 12, e.g. the scanning location, the pulse frequency, or the light intensity;
 A spatial profile indicating the location of the second vehicle 12 within an environment, potentially induced using the spatial data 116 previously collected;
 Data that may indicate the past or upcoming scanning behavior of the second vehicle 12.

The feedback module 135 receives and analyses the externally-induced illumination data 112. This analysis may enable a range of actions designed to enhance or alter the performance or behavior of the first vehicle 11 or its various components. The analysis and subsequent action may be conducted via two or more subsystems, which may include a component that takes the externally-induced illumination data 112 as input and extracts one or more relevant parameters from the data. The feedback module 135 may further comprise a component that receives the extracted relevant parameters and triggering or enacting one or more actions or behaviors in the first vehicle 11.

The feedback module 135 may, for example, provide imaging parameters feedback data 136 to imaging parameters control module 105. The imaging parameters 106 prepared by the imaging parameters control module 105 may be adapted by means of the imaging parameters feedback data 136. The imaging parameters control module 105 of the first vehicle may adjust the imaging parameters 106 to optimize the mapping behavior of the first vehicle 11. This may include:
 a. Adapting scanning parameters such as light modulation frequency or location in order to minimize noise in regions of increased scanning activity;
 b. Stopping or postponing scanning of an area that has already been or is currently being scanned by another vehicle;
 c. Initiating a scan in an area that has not yet been scanned by another vehicle.

The feedback module 135 may be further arranged to initiate data communication to the second vehicle 12 (or other vehicles) such that transmitted data 25 may be received by the second vehicle 12 or the cloud via a communication module comprised by the first vehicle 11. Collaborative scanning between the first vehicle 11 and the second vehicle 12 may be achieved via control by means of a communication module. Collaborative actions may include:
 a. Sharing of imaging parameters 106 and/or relative location to optimize collaborative scanning of an unknown area. This may include tailored scanning routines that split the relative field-of-view (e.g. first and second field of detection 151, 152) of the collaborating vehicles (e.g. first vehicle 11 and second vehicle 12) into sections for optimized scanning efficiency based on the parameters of each vehicle;
 b. Sharing of map data to enhance the spatial knowledge of an area. This may include the ability to request missing map data from other vehicles, or provide security through map data redundancy.

The feedback module 135 may further enable predictive driving assistance. Information obtained from a second vehicle 12 may be used to predict its behavior and enact certain actions in response. Information may indicate:

a. Increased likelihood of the second vehicle 12 making a certain movement or approaching a certain area;
b. Increased likelihood of a second vehicle 12 being at a location that is out of the line-of-sight of the first vehicle 11;
c. Increased likelihood of congested areas.

Feedback information provided by the feedback module 135 may further be used to inform the driver of the first vehicle 11. Furthermore, safety margins may be adapted with respect to distances between, for example, the first vehicle 11 and the second vehicle 12. The feedback module 135 may further provide motion control feedback data 137, which is transmitted to motion control module 185. The motion control module 185 may change motion parameters of the first vehicle 11 in reaction to the reception of the motion control feedback data 137. Current or planned movement of the first vehicle 11, including its speed, trajectory and braking behavior may be changed in reaction to the motion control feedback data 137.

The second vehicle 12 comprises an imaging system which may be arranged in accordance with the description of the imaging system 100 comprised by the first vehicle 11 provided above.

Figure 4:
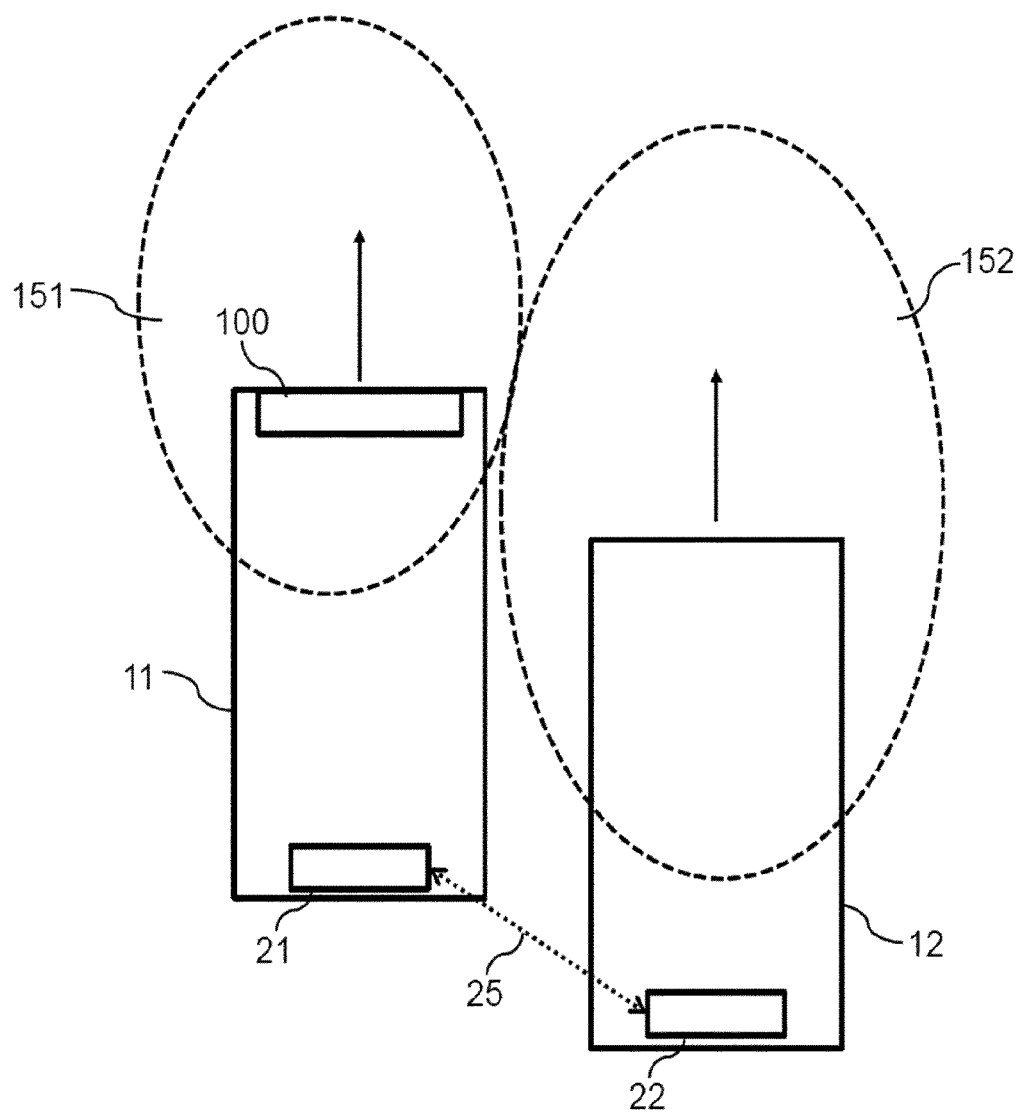
FIG. 4 shows a principal sketch of a first and a second autonomous vehicle comprising an imaging system according to a fourth embodiment.

FIG. 4 shows a principal sketch of a first autonomous vehicle 11 and a second autonomous vehicle 12. The first vehicle comprises an imaging system 100 according to a fourth embodiment. The starting situation may be similar as discussed with respect to FIG. 2.

The imaging system 100 provides feedback data upon detection of light emitted by the second vehicle to overlap region 151' such that a communication module of the first vehicle 21 opens a communication channel to a communication module of the second vehicle 22. The first and the second vehicle 11, 12 transmit data 25 via the communication channel. The first vehicle 11 or more precisely the imaging system 100 gets information with respect to the second field of detection 152 of the second vehicle 12 and information with respect to the motion of the second vehicle 12. The imaging system 100 adapts the first field of detection 151 such that an overlap between the first field of detection and the second field of detection is minimized.

Figure 5:
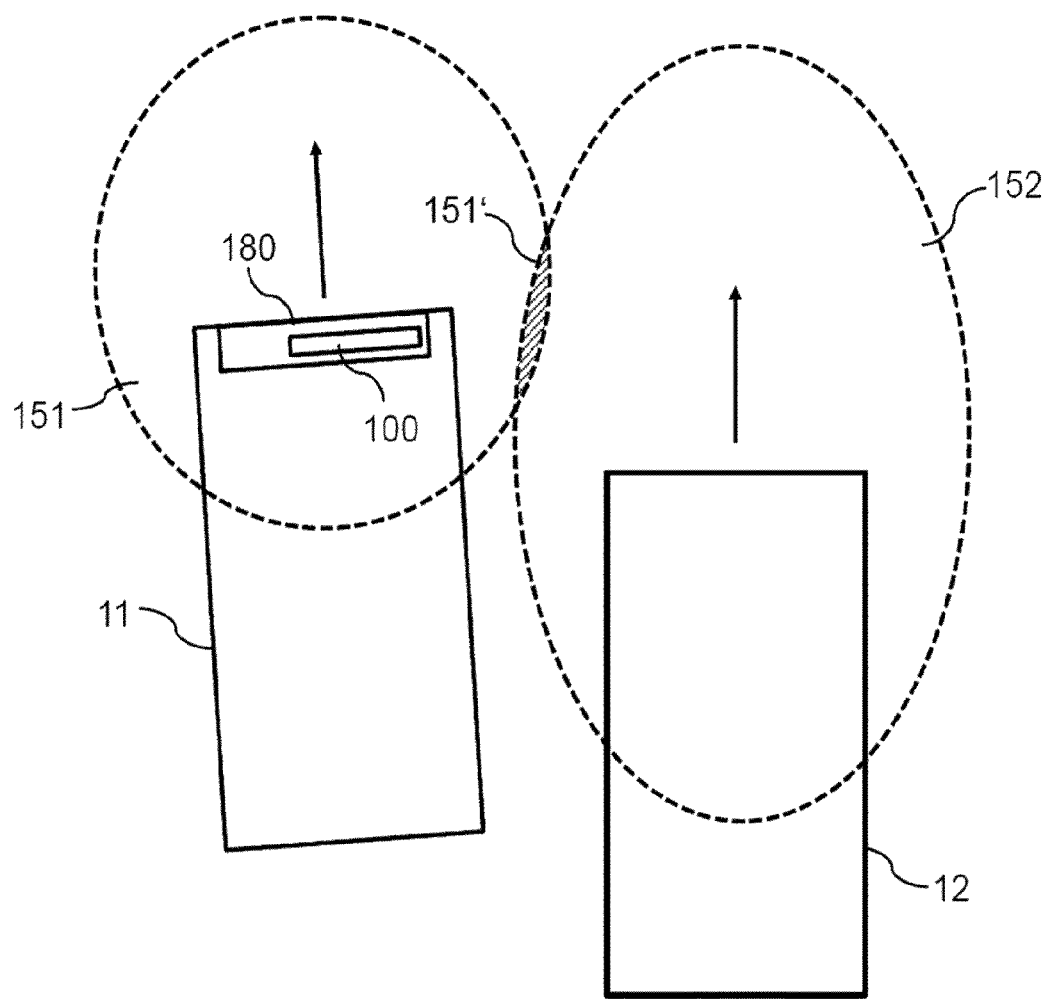
FIG. 5 shows a principal sketch of a first and a second autonomous vehicle comprising an imaging system according to a fifth embodiment.

FIG. 5 shows a principal sketch of a first autonomous vehicle 11 and a second autonomous vehicle 12, wherein the first vehicle comprises an imaging system 100 according to a fifth embodiment. The starting situation may be similar as discussed with respect to FIG. 2.

The imaging system 100 provides feedback data upon detection of light emitted by the second vehicle 12 to overlap region 151' between the first field of detection 151 and the second field of detection 152 of the second vehicle 12. The feedback data comprises motion control feedback data 137 as discussed with respect to FIG. 3, which is transferred to a guiding system 180. The guiding system 180 changes a direction of movement of the first vehicle such that the overlap region 151' is reduced without changing a size of the first field of detection 151.

Figure 6:
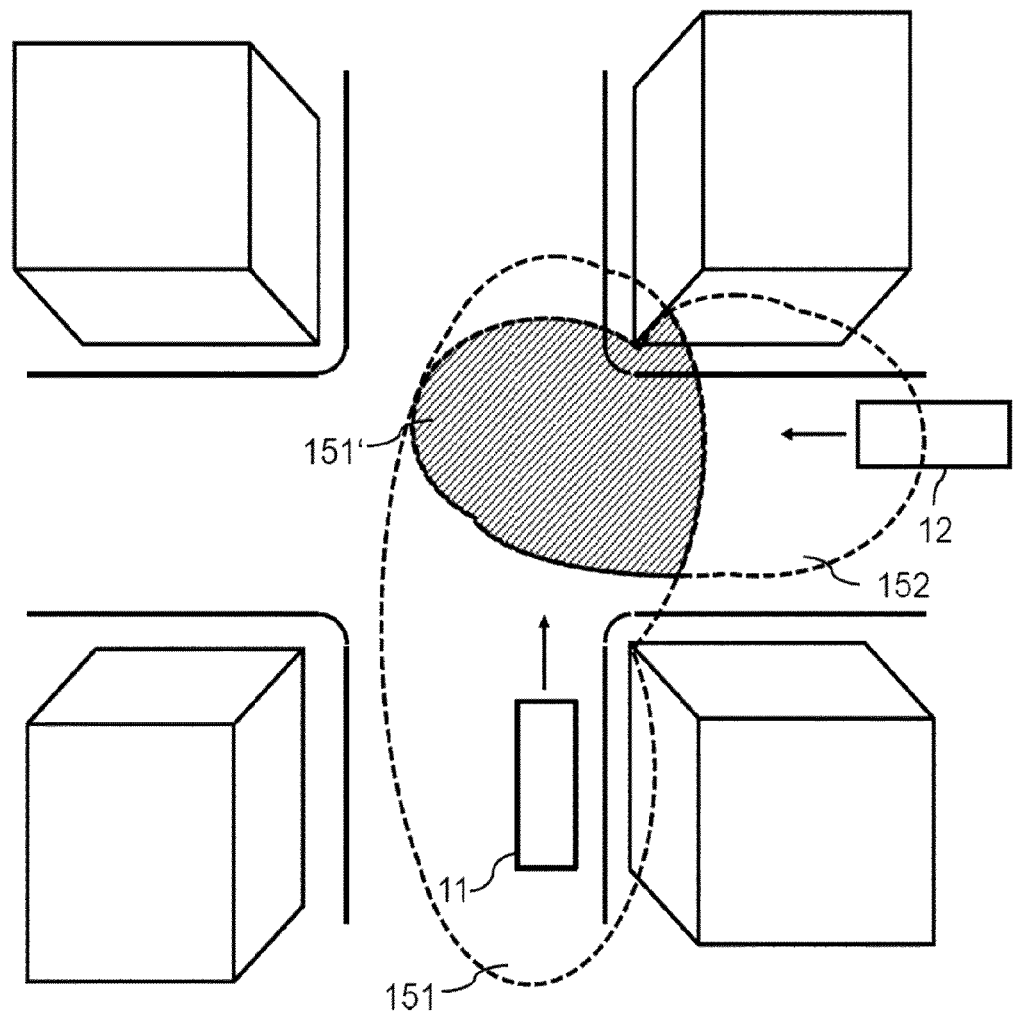
FIG. 6 shows a principal sketch of a second embodiment of a first system comprising a first and a second autonomous vehicle.

FIG. 6 shows a principal sketch of a first system according to a second embodiment comprising a first vehicle 11 and a second vehicle 12. The first vehicle 11 and the second vehicle 12 each comprise an imaging system. Each imaging system is arranged to provide a first field of detection 151 or second field of detection 152. The shape of the respective field of detection 151, 152 is adapted based on spatial data available in the map database. The first vehicle 11 and the second vehicle 12 approach to a crossroad. The first field of detection 151 and the second field of detection 152 overlap in overlap region 151'.

The first vehicle 11 projects information signals, which are comprised in the light emitted to the first field of detection 151. The information signals comprise information with respect to the movement of the first vehicle 11. The second vehicle detects the information which is visible in the overlap region 151'. The second vehicle 12 projects a confirmation signal and additional information to the second field of detection 152. The additional information may comprise information that the second vehicle 12 will stop before the second vehicle will reach the crossroad because passengers of the second vehicle 12 intend to leave the second vehicle 12. The first vehicle 11 confirms reception and passes the crossroads without changing its velocity. The first vehicle 11 may optionally initiate communication with the second vehicle 12 via a separate wireless complication channel as discussed with respect to FIG. 4.

Figure 7:
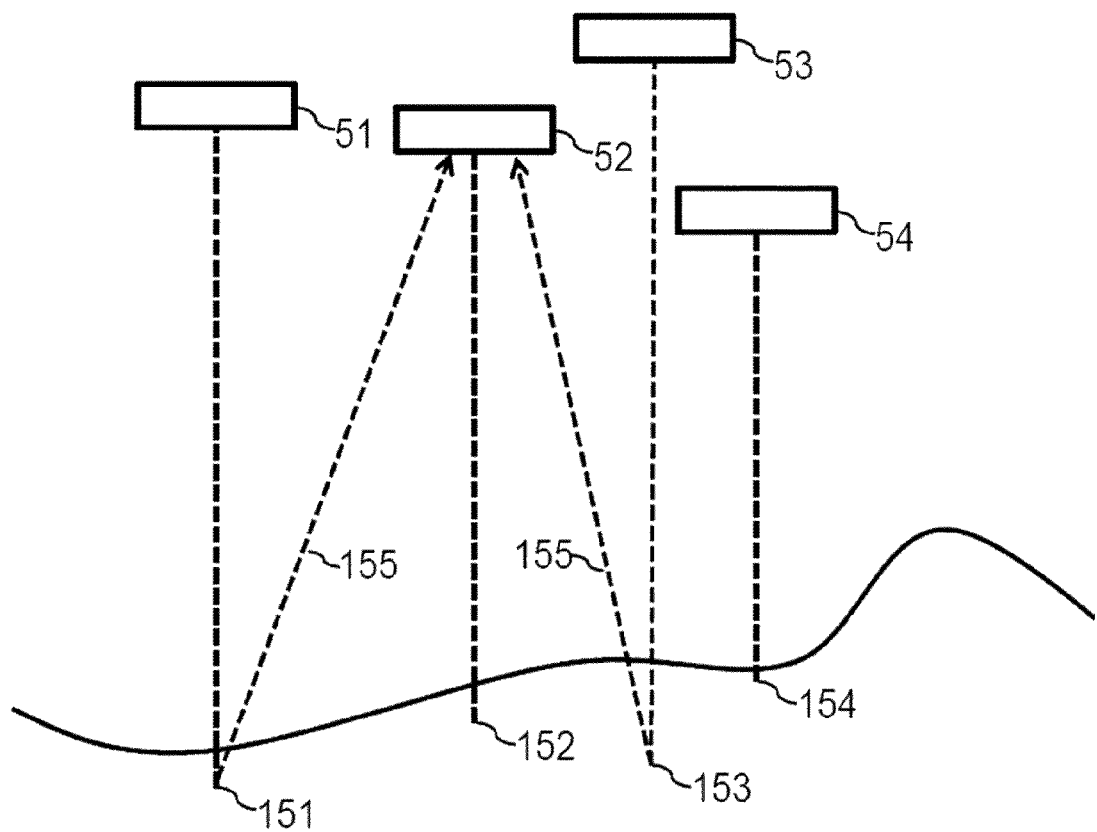
FIG. 7 shows a principal sketch of a swarm of unmanned aerial vehicles comprising an imaging system according to a seventh embodiment.

FIG. 7 shows a principal sketch of a swarm of unmanned aerial vehicles 51, 52, 53, 54 comprising imaging systems according to a seventh embodiment. The light source and the light sensor form a time-of-flight based imaging system.

The imaging system of a second unmanned aerial vehicle 52 sends out a light pulse to the ground to a second field of detection 152, which then reflects and is captured by the corresponding light sensor. The captured light pulse is used, for example, to measure the distance-to-ground of the second unmanned aerial vehicle 52 to inspect the underlying terrain or vegetation, etc. Each of the unmanned aerial vehicles 51, 52, 53, 54 comprises a corresponding field of detection 151, 152, 153, 154. The light sensors of or unmanned aerial vehicles 51, 52, 53, 54 are characterized by a wide field-of-view to capture the light pulse reflections that are emitted by neighboring unmanned aerial vehicles. The light sensor of the second unmanned aerial vehicle 52 receives, for example, reflected light 155 originating from its own light source (second field of detection 152) and from a first field of detection 151 of a first unmanned aerial vehicle 51 and a third field of detection 153 of a third unmanned aerial vehicle 53.

The capturing of the reflected light pulses emitted by the second unmanned aerial vehicle 52 may be used for various purposes, for example:
a. Measuring the distance between the second unmanned aerial vehicle 52 and, for example, the first unmanned aerial vehicle 51, i.e. the relative height and lateral distance.
b. Sending a light signal with encoded information from the first unmanned aerial vehicle 52 via the ground to the first or third unmanned aerial vehicle 51, 53.
c. Coordinating collective movements between the second unmanned aerial vehicle 52 and the first and third unmanned aerial vehicle 51, 53 to avoid collision and/or to synchronize their flight formation.
d. Coordinating collective illumination patterns for active imaging purposes.

The above use cases may especially be of interest in the following scenarios:
a. The unmanned aerial vehicles 51, 52, 53, 54 are not aware of their precise relative position, employing the ground as a common reference frame.
b. The unmanned aerial vehicles 51, 52, 53, 54 have limited communication bandwidth (e.g. radio communication via an independent communication channel) available, or would like to communicate via an alternative channel for redundancy or safety reasons.
c. A low power and small sized solution is required for the execution of a decentralized control algorithms for unmanned aerial vehicles 51, 52, 53, 54 formations.

d. The unmanned aerial vehicles 51, 52, 53, 54 have limited energy storage capacity to illuminate a given area, and thus need to coordinate active illumination between them in order to provide the desired illumination power collectively.

Figure 8:
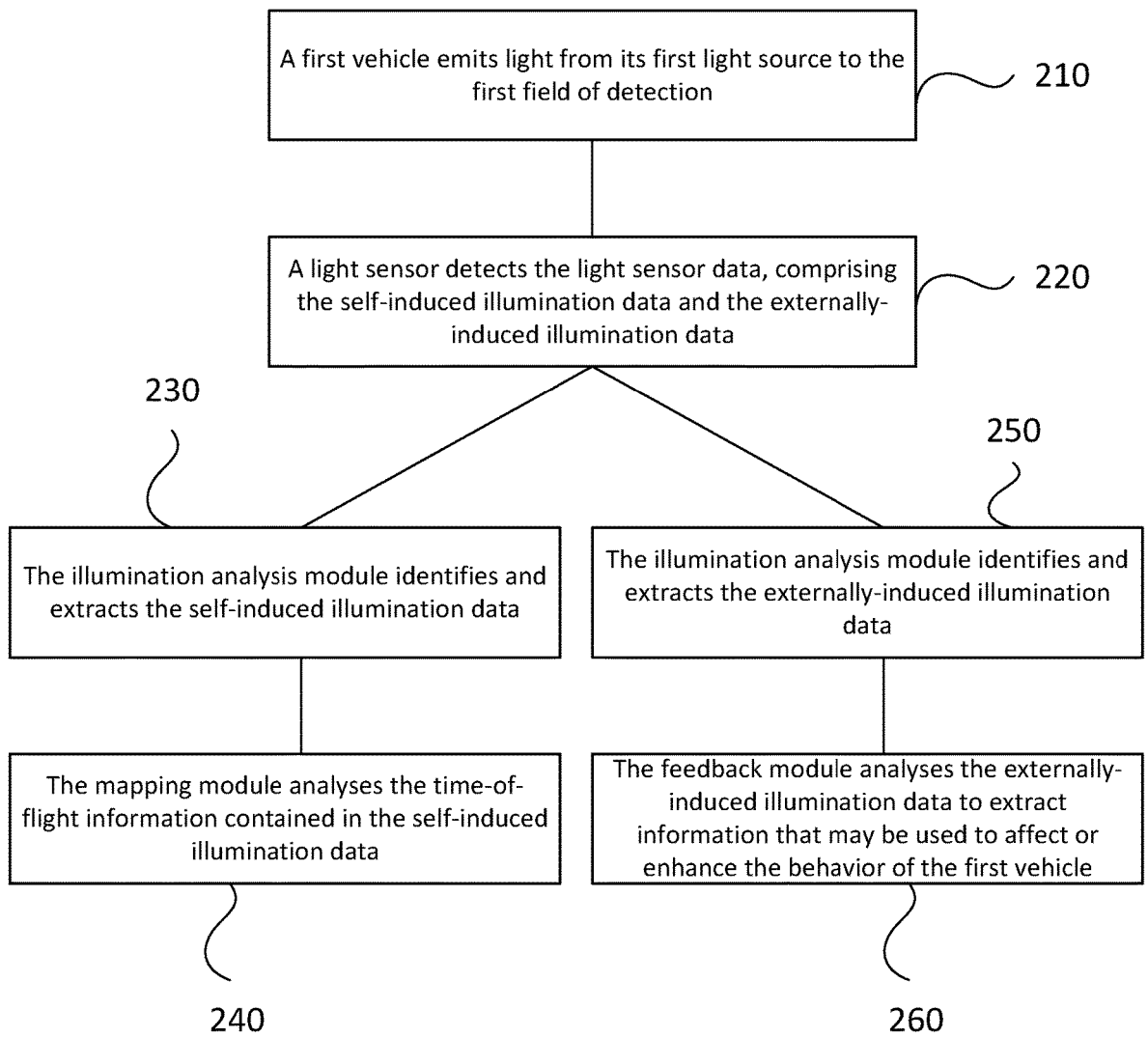
FIG. 8 shows a principal sketch of a method of guiding an autonomous movable object.

FIG. 8 shows a principal sketch of a method of guiding an autonomous movable object.

A first vehicle 11 emits light from its first light source in a predetermined pattern to the first field of detection 151 following the imaging parameters 106 set by the imaging parameters control module 105 (see FIG. 3) in step 210. The light illuminates the first field of detection 151 and is reflected from various surfaces at different spatial locations around the first vehicle 11.

In a nearby location, a second vehicle 12 is also emitting light at particular scanning settings. A light sensor 130 detects the light sensor data 131, comprising the self-induced illumination data 111 (the reflected light emissions of the first vehicle 11) and the externally-induced illumination data 12 (the light emitted by the light source of the second vehicle 12) in step 220.

In a single light sensor system, the self-induced and externally-induced illumination data 111, 112 are detected as a single information stream, to be extracted individually later in the process. In a two light sensor system, the self-induced and externally-induced illumination data 111, 112 are detected separately as two distinct information streams. The light sensor 130 submits the light sensor data 131 to the illumination analysis module 110, which identifies and extracts the self-induced illumination data 111 in step 230 and the externally-induced illumination data 112 in step 250.

The illumination analysis module 110 may determine various parameters of the received light sensor data 131, such as direction, pulse frequency and light intensity. These parameters are then compared to the known imaging parameters 106 as set by the imaging parameters control module 105. The light sensor data 131 is split into two datasets, where the first set has a high correlation (self-induced illumination data 111) and the second a low correlation (externally-induced illumination data 112) with the imaging parameters 106.

The illumination analysis module 110 sends the self-induced illumination data 111 to the mapping module 115. The illumination analysis module 111 sends the externally-induced illumination data 112 to the feedback module 135. The mapping module 115 analyses in step 240 the time-of-flight information contained in the self-induced illumination data 111. The mapping module 111 uses the depth measurements described by the time-of-flight data to produce a depth map of the surrounding area that indicates environmental features associated with various spatial locations. The depth map is sent to the map database 120, where it is combined and stored with any existing data on the scanned area.

The feedback module 135 analyses in step 260 the externally-induced illumination data 112 to extract information that may be used to affect or enhance the behavior of the first vehicle 11. The feedback module 135 uses the extracted information to trigger a desired action, which produces an output that may include performance optimization within vehicles and collaborative behavior between vehicles with regards to imaging, scanning, mapping, route planning, navigation and safety.

In the near future, LIDAR will overcome the cost-size-performance trade-off that is currently affecting its widespread integration especially into road vehicles. At this point, the number of LIDAR-equipped vehicles on our roads will increase, presenting a new problem: a larger number of LIDAR-emitting vehicles increases the probability of crosstalk affecting the ability of those vehicles to navigate accurately and safely.

At the same time, with the development of increased sensing capabilities of vehicles, other time-of-flight based sensing and imaging systems are expected to experience increased adaption in automotive applications.

By actively monitoring and reacting to the time-of-flight based sensing, ranging and imaging behaviors of other vehicles, the present invention enables, for example, a vehicle to modify its own active imaging settings to optimize information gathering for both itself and other vehicles. The real-time information obtained can also be combined with self-generated mapping data and used to autonomously trigger certain actions within the vehicle that can enhance its safety and performance.

The invention provides at least the following advantages:

Reactive detection of and response to crosstalk produced by active imaging overlap with nearby vehicles.

Predictive capabilities in a vehicle comprising a time-of-flight system, facilitated by the detection and analysis of light emissions from other vehicles. These capabilities may include predicting the movements and imaging behaviors of other vehicles, and road congestion in the surrounding area.

Enhanced spatial knowledge of an area and the actors within it, enabled by combining the time-of-flight imaging ability of the vehicle with information extracted from the time-of-flight imaging behaviors of other vehicles.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 11 first vehicle
12 second vehicle
21 communication module of first vehicle
22 communication module of second vehicle
25 transmitted data
51 first unmanned aerial vehicle
52 second unmanned aerial vehicle
53 third unmanned aerial vehicle
54 fourth unmanned aerial vehicle
100 imaging system
105 imaging parameters control module
106 imaging parameters
110 illumination analysis module
111 self-induced illumination data
112 externally-induced illumination data
115 mapping module
116 spatial data
120 map database
125 first light source
130 light sensor
131 light sensor data
135 feedback module
136 imaging parameters feedback data
137 motion control feedback data
150 field of observation
151 first field of detection
151' overlap of fields of detection
152 second field of detection
153 third field of detection
154 fourth field of detection
155 reflected light
180 guiding system
185 motion control module
210 step of illuminating first field of detection
220 step of detecting reflected light
230 step of identifying self-induced illumination data
240 step of creating spatial data
250 step of identifying externally-induced illumination data
260 step of providing feedback data

The invention claimed is:

1. A guiding system for guiding an autonomous movable object, the guiding system comprising:
a time-of-flight imaging system comprising:
a first light source, wherein the first light source is arranged to illuminate a first field of detection; and
at least one light sensor, wherein the light sensor is configured to detect reflected light, wherein the detected reflected light comprises first reflected light and second reflected light, wherein the first reflected light comprises light emitted by the first light source reflected at the first field of detection, wherein the second reflected light originates from a second field of detection illuminated by a second light source, wherein the second light source is independent from the first light source, wherein the second light source is a light source coupled to a different movable object, wherein the time-of-flight imaging system is configured to differentiate between the first reflected light and the second reflected light, wherein the time-of-flight imaging system is configured to determine a depth map of the first field of detection based on the detected first reflected light, and wherein the time-of-flight imaging system is configured to generate a feedback signal for triggering a feedback action based on the detected second reflected light; and
a motion controller, wherein the motion controller is configured to receive the feedback signal, and to guide the autonomous movable object so as to change a direction of movement of the autonomous movable object based on the feedback signal.

2. The guiding system according to claim 1, wherein the second reflected light comprises light emitted by a time-of-flight detector, wherein the time-of-flight imaging system is configured to identify light originating from the time-of-flight detector based on the detected second reflected light, and wherein the feedback signal is adapted in accordance with the detected light emitted by the time-of-flight detector.

3. The guiding system according to claim 1, wherein the second reflected light is light received from an overlap of the first field of detection and the second field of detection.

4. The guiding system according to claim 3, wherein the time-of-flight imaging system is further configured to modify the first field of detection based on the feedback signal.

5. The guiding system according to claim 4, wherein the time-of-flight imaging system is configured to modulate the first light source to integrate an optical information signal in the first field of detection, wherein the optical information signal comprises information about at least one of a time of emission, a position at a time of emission, a velocity, or an intended driving direction.

6. The guiding system according to claim 4, wherein the time-of-flight imaging system is configured to modify the first field of detection such that the overlap between the first field of detection and the second field of detection is reduced as compared to prior to the modification.

7. The guiding system according to claim 4, wherein the time-of-flight imaging system is configured to modify an emission wavelength of the first light source.

8. The guiding system according to claim 1, wherein the time-of-flight imaging system is configured to establish a communication channel with a second movable object to exchange information data related to the detected second reflected light, wherein the communication channel is independent from the first light source.

9. The guiding system according to claim 8, wherein the time-of-flight imaging system is configured to modify the first field of detection based on information data received via the communication channel.

10. The guiding system according to claim 1, wherein the light sensor comprises at least a first light sensor and a second light sensor, wherein the first light sensor is configured to detect the first reflected light and wherein the second light sensor is configured to detect the second reflected light.

11. The guiding system according to claim 10, wherein the first light sensor and the second light sensor of the time-of-flight imaging system have a different spectral sensitivity.

12. A system comprising a first autonomous movable object and a second autonomous movable object, wherein each of the first autonomous movable object and the second autonomous movable object comprises a respective one of the guiding system according to claim 1, wherein the first autonomous movable object and the second autonomous movable object are configured to exchange data in reaction to the feedback signal, wherein the first autonomous movable object or the second autonomous movable object is configured to modify a corresponding field of detection or to modify a motion of the first autonomous movable object or the second autonomous movable object in reaction to the exchanged data.

13. A system comprising a plurality of autonomous movable objects, each of the plurality of autonomous movable object comprises a respective one of the guiding system according to claim 1, wherein each of the autonomous movable objects is configured to modify a motion of the respective one of the autonomous movable objects in reaction to the feedback signal generated upon detection of at least one field of detection of another one of the autonomous movable object.

14. A method of guiding an autonomous movable object, the method comprising:

illuminating a first field of detection;

detecting reflected light, wherein the detected reflected light comprises first reflected light and second reflected light, wherein the first reflected light comprises light illuminating the first field of detection, wherein the second reflected light originates from a second field of detection illuminated by a second light source coupled to a different movable object and illuminated independently from illumination of the first field of detection;

differentiating between the first reflected light and the second reflected light;

determining a depth map of the first field of detection based on the detected first reflected light for guiding the autonomous movable object;

generating a feedback signal for triggering a feedback action based on the detected second reflected light for guiding the autonomous movable object; and modifying a direction of movement of the autonomous movable object based on the feedback signal.

15. A non-transitory computer readable medium comprising computer readable instructions configured to be saved on at least one memory device comprised in a guiding system, wherein the computer readable instructions are configured such that, when executed by at least one processor of the guiding system, the guiding system performs the method according to claim 14.

* * * * *